US 6,588,284 B1

(12) United States Patent
Shiraishi et al.

(10) Patent No.: US 6,588,284 B1
(45) Date of Patent: Jul. 8, 2003

(54) CORIOLIS MASS FLOWMETER AND METHOD OF MAKING SAME

(75) Inventors: Yasuichi Shiraishi, Tokyo (JP); Yuichi Nakao, Tokyo (JP); Kenichi Matsuoka, Tokyo (JP); Seiji Kobayashi, Tokyo (JP)

(73) Assignee: Oval Corporation (JP)

( * ) Notice: Subject to any disclaimer, the term of this patent is extended or adjusted under 35 U.S.C. 154(b) by 0 days.

(21) Appl. No.: 09/555,282

(22) PCT Filed: Jul. 29, 1999

(86) PCT No.: PCT/JP99/03649

§ 371 (c)(1),
(2), (4) Date: May 25, 2000

(87) PCT Pub. No.: WO00/06975

PCT Pub. Date: Feb. 10, 2000

(30) Foreign Application Priority Data

Jul. 29, 1998 (JP) .......................................... 10-213757

(51) Int. Cl.$^7$ ................................................. G01F 1/84
(52) U.S. Cl. ..................................... 73/861.355; 29/592
(58) Field of Search ........................... 73/355, 356, 357,
73/354; 29/592, 592.1, 595, 825, 854

(56) References Cited

U.S. PATENT DOCUMENTS

| 4,311,054 A | * | 1/1982 | Cox et al. ................. 73/861.38 |
| 4,711,132 A | * | 12/1987 | Dahlin ....................... 73/861.38 |
| 4,756,198 A | * | 7/1988 | Levien ...................... 73/861.38 |
| 5,287,754 A | | 2/1994 | Kazakis |
| 5,301,557 A | * | 4/1994 | Cage et al. ............... 73/861.38 |

FOREIGN PATENT DOCUMENTS

| WO | WO 88/02475 | 4/1988 |
| WO | WO 89/01134 | 2/1989 |

OTHER PUBLICATIONS

US 6,044,715, 4/2000, Ollila et al. (withdrawn)*

* cited by examiner

Primary Examiner—Hezron Williams
Assistant Examiner—Corey D. Mack
(74) Attorney, Agent, or Firm—McGlew and Tuttle, P.C.

(57) ABSTRACT

A Coriolis mass flowmeter of a type in which a fluid to be measured is caused to flow in series by forming two parallel flow tubes 1 and 2, which are obtained by bending one conduit. The inlet portion of conduit between an external connecting portion 35 connected to inlet piping and the inlet of one flow tube 2 is bent in the shape of the letter L and bent in another direction in combination, and the outlet portion of conduit between an external connecting portion 36 connected to outlet piping and the outlet of the other flow tube 1 is bent in the shape of the letter L symmetrically with respect to the above inlet portion of conduit and bent in another direction in combination. The external connecting portions 35 and 36 are arranged on the same axis. The present invention simplifies the construction of connection to external piping, simplifies the assembling of the Coriolis mass flowmeter itself, and permits a high-accuracy measurement of mass flow rate by reducing the vibrations of external piping, etc.

10 Claims, 3 Drawing Sheets

Part A in detail

CORIOLIS MASS FLOWMETER AND METHOD OF MAKING SAME

FIELD OF THE INVENTION

The present invention relates to a Coriolis mass flowmeter and, more particularly, to a loop-type Coriolis mass flowmeter in which two parallel bent tubes are connected in series.

BACKGROUND OF THE INVENTION

When a tube through which a fluid to be measured flows is supported at the one or both ends thereof and vibrated at this supporting point in a direction vertical to the direction of fluid flow in the tube, Coriolis forces acting on the tube (a tube to which vibrations are applied is hereinafter referred to as a flow tube) are proportional to a mass flow rate. A mass flowmeter based on this principle (a Coriolis mass flowmeter) is well known. Flow tubes used in this Coriolis mass flowmeter are broadly classified into bent tubes and straight tubes according to their shape.

In a Coriolis mass flowmeter of the straight tube type, a mass flow rate is measured as a difference in the displacement of the straight tube caused by the Coriolis forces between the supporting point and the middle portion of the straight tube, i.e., a phase difference signal, when the Coriolis mass flowmeter is vibrated in a direction vertical to the axis of the straight tube supported at both ends. In such Coriolis mass flow meters of the straight tube type, it is difficult to achieve high detection sensitivity though they are simple, compact and robust in construction.

In contrast, Coriolis mass flowmeters of the bent tube type, in which the shape of the bent tube can be selected appropriately to effectively take out Coriolis forces, can detect ass flow rates with high sensitivity. It is also known that in order to more efficiently drive this measuring bent tube, the bent tube in which a fluid to be measured flows is constituted of two parallel tubes.

FIG. 4 schematically shows this conventional Coriolis mass flowmeter of the two parallel bent tube type. As shown in the figure, the flow tube is fabricated from two parallel U-shaped tubes in which a branching portion is formed on the inlet side of the fluid to be measured and a junction portion is formed on the outlet side thereof. The fluid to be measured is equally divided into two flow tubes on the inlet side and joins on the outlet side of the flow tubes. By causing the fluid to be measured to flow equally in two flows in this manner, it is possible to constantly make the natural frequency of two flow tubes equal even when the kind of fluid changes, or the temperature fluctuates. It is known that this permits efficient and stable driving of flow tubes and makes it possible to form a Coriolis mass flowmeter that is not affected by external vibrations or temperature changes.

Pressure losses or clogging of flow tubes with the fluid to be measured may sometimes occur in the branching portion at the inlet of the fluid and the junction portion at the outlet thereof. This poses a problem especially in the case of high-viscosity fluids and liquids such as perishable and easy-to-clog foods. Furthermore, when one flow tube is recovered from clogging during the flushing of flow tubes with a branching portion, the flushing performance of the other flow tube deteriorates, leading to a long flushing time.

A loop-type Coriolis mass flowmeter, in which two practically parallel bent tubes are fabricated from one bent tube as shown in FIG. 5 and thereby the fluid to be measured is caused to flow in series, is also known as an improvement on the above Coriolis mass flowmeter.

In tubes of this loop type, however, the problem resulting from the formation of the above branching and junction portions can be solved, but their connection to external piping is complex and difficult because of their three-dimensional (not two-dimensional) geometry. At the same time, measuring accuracy is affected by strains caused during the fabrication of flow tubes, and the tubes of the loop type are susceptible to the effect of external vibrations.

SUMMARY OF THE INVENTION

To solve the above problems, an object of the present invention is to provide a Coriolis mass flowmeter which has a simple connection to external piping and can be assembled in a simplified manner while maintaining the advantage of the Coriolis mass flowmeter having a parallel double bent tube, that is, freedom of pressure losses or clogging with a fluid by bending a single tube in the above-mentioned manner to eliminate branching and junction portions.

Another object of the present invention is to provide a Coriolis mass flowmeter which can measure mass flow rate with high accuracy by reducing strains caused during working and at the same time by reducing the vibrations of external piping, etc.

The Coriolis mass flowmeter according to the present invention is a type in which a fluid to be measured is caused to flow in flow tubes connected in series by forming two parallel flow tubes 1 and 2, which are obtained by bending a single tube. The Coriolis mass flowmeter is characterized in that the inlet portion of conduit between an external connecting portion 35 connected to inlet piping and an inlet of one flow tube 2 is bent in an L shape and further bent in another direction, and the outlet portion of conduit between an external connecting portion 36 connected to outlet piping and an outlet of the other flow tube 1 bent in an L shape symmetrically with respect to the inlet portion of conduit, with an additional bend in another direction combined, with the result that the external connecting portions 35 and 36 are arranged on the same axis. This facilitates horizontal external connection during assembly. As mentioned above, loop-type bent tubes need to be three-dimensionally bent. In the present invention, this three-dimensional bending can be accomplished with the connecting portions of the inlet portion of conduit, outlet portion of conduit and two flow tubes. Thus, flow tubes that require working without generation of strains can be formed by two-dimensional bending alone.

A fixing member 32 of hollow construction is provided to integrally fix each end of the two flow tubes 1 and 2 via a supporting member 33 fabricated from a separate sheet and there is also provided an outer casing 30 which further supports this fixing member 32. The supporting member 33 is fixedly fitted to the fixing member at two locations opposite to the hollow fixing member 32 for each end of each of the flow tubes 1 and 2 and, at the same time, fixes the ends of the flow tubes 1 and 2. This facilitates the installation and fixing of the flow tubes and can prevent unwanted torque, vibration and wobble of the flow tubes. In the present invention, firm supporting is achieved at low cost with the use of supporting members fabricated from sheets and a hollow fixing member for fixing the supporting members, thereby reducing the vibrations of external piping, etc. and permitting a high-accuracy measurement of mass flow rate.

The outer casing 30 has a hollow shell construction and the fixing member 32 is supported by the outer casing at a plurality of points (supporting portions 38) independently, not over the whole surface. Furthermore, a pressure-resistant case 31 is provided to be tightly connected to the outer casing 30. This pressure-resistant case 31 accommodates one conduit including the flow tubes and all accessory components of the conduit that include a drive 15, a pair of detecting sensors 16 and 17 and the fixing member 32. In the present invention, the outer casing has a shell construction and the pressure-resistant case is connected integrally to the outer casing. This not only enables the vibrating structural portions of flow tubes to be strongly protected against stresses from external piping, but also prevents the liquid flowing through the tubes from flowing out of the pressure-resistant vessel even in case of a breakage of the tubes.

Furthermore, the method of making the Coriolis mass flowmeter according to the present invention involves integrally assembling the conduit and accessory components of the conduit, such as the fixing member 32 for fixing each end of the flow tubes, the drive 15 and the pair of detecting sensors 16 and 17, as a unit. This unit is arranged in the outer casing 30 having a shell construction in a manner that the outer connecting portions 35 and 36 are on the same axis. This facilitates assembling and can reduce the assembling time.

DETAILED DESCRIPTION OF THE PREFERRED EMBODIMENTS

Figure 1:
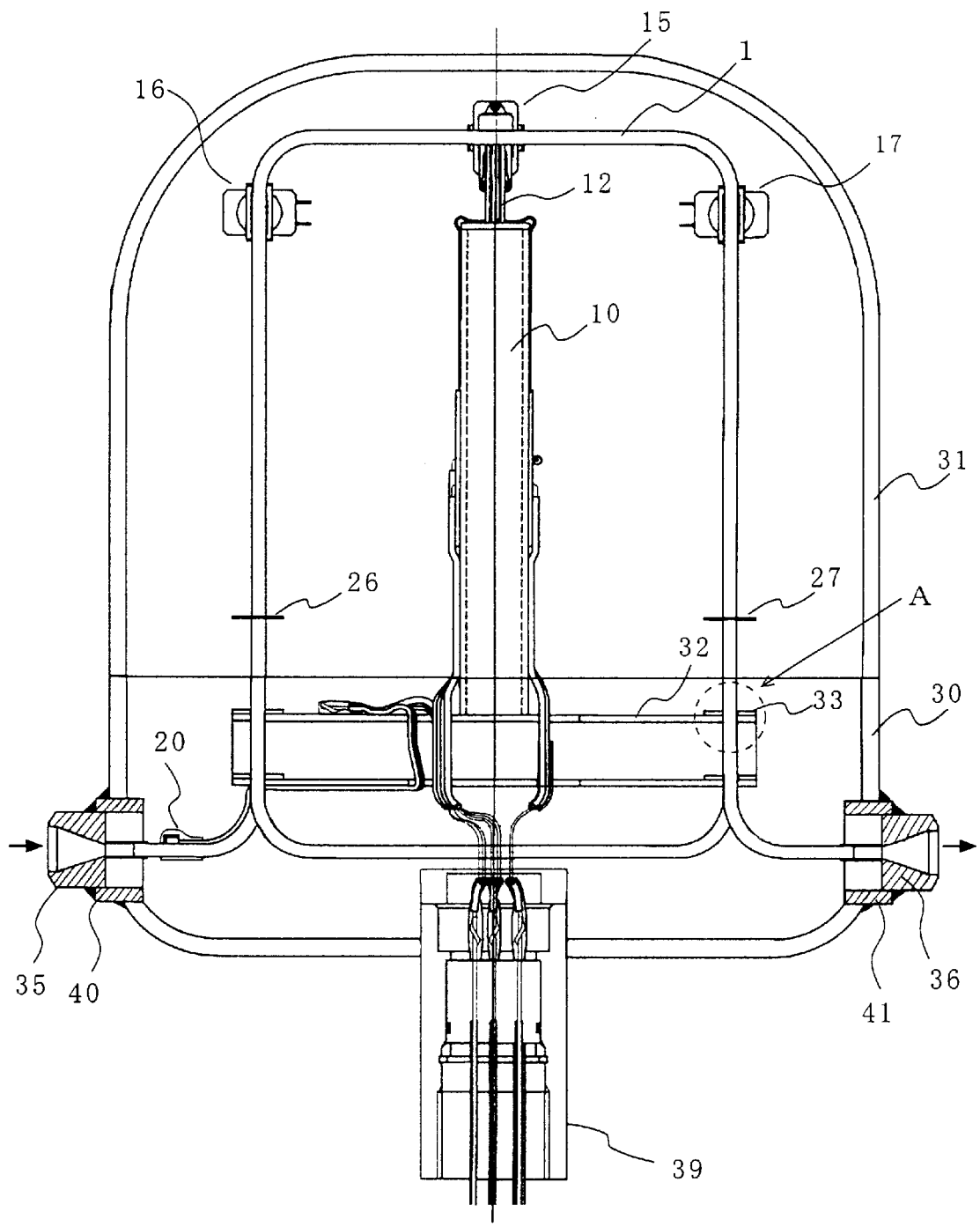
FIG. 1 shows a front view of an example of Coriolis mass flowmeter to which the present invention is applied.
Figure 2:
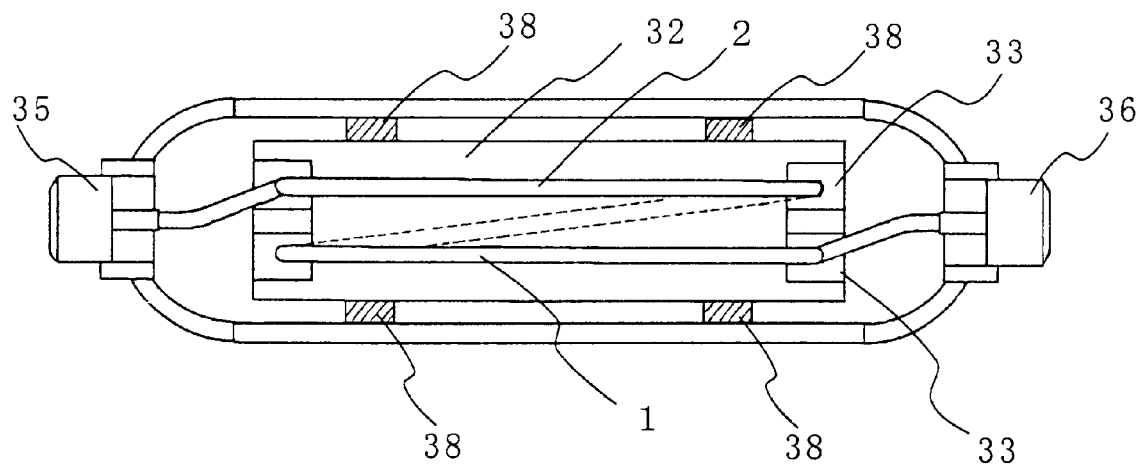
FIG. 2 shows the construction of the Coriolis mass flowmeter shown in FIG. 1 and in particular of the flow tubes as seen from the top.
Figure 3:
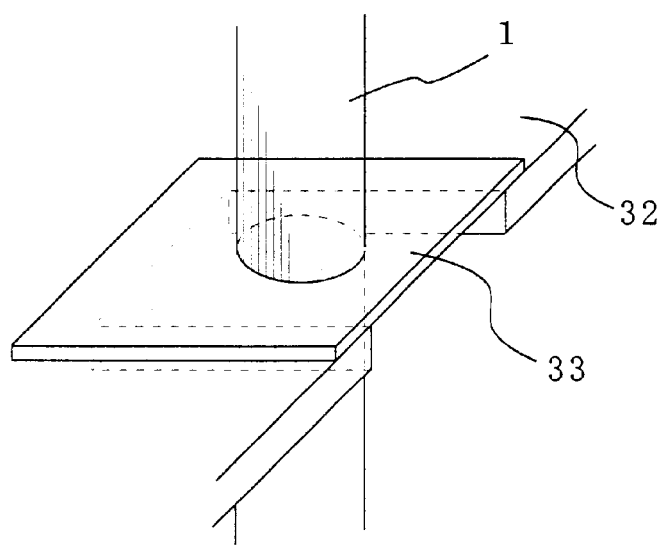
FIG. 3 shows Part A of FIG. 1 in detail.
Figure 4:
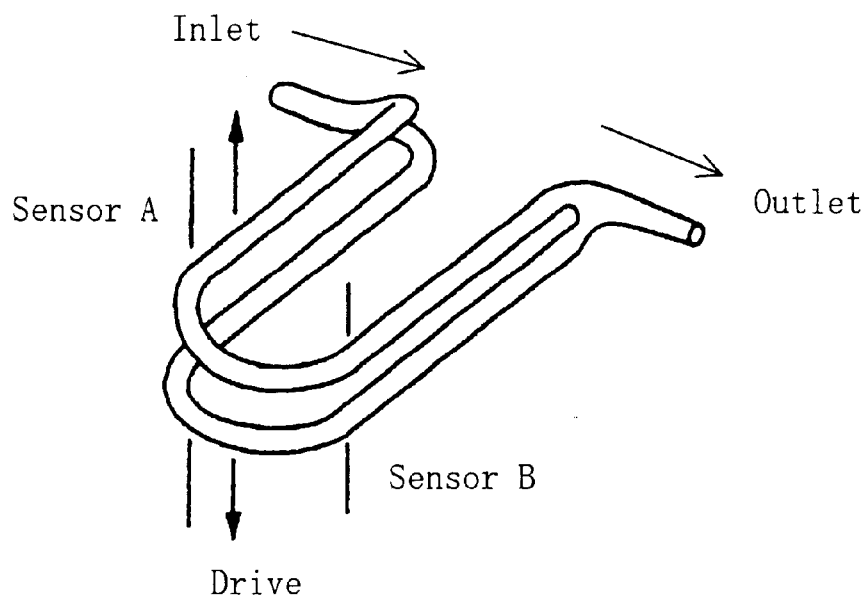
FIG. 4 schematically shows a conventional Coriolis mass flowmeter of the parallel two bent tubes.
Figure 5:
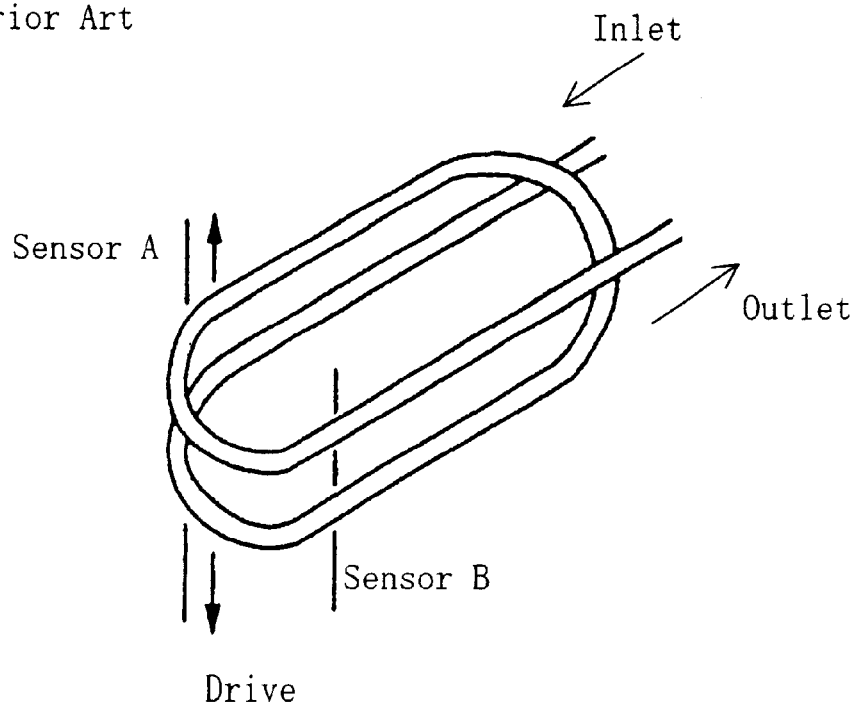
FIG. 5 schematically shows a conventional loop-type Coriolis mass flowmeter in which a fluid to be measured is caused to flow in series.

FIGS. 1 to 3 show an example of Coriolis mass flowmeter to which the present invention is applied. The following explanation will be made by supposing a case where flow tubes of the two parallel bent tube type fabricated by bending one tube are installed in a vertical plane. However, it is also possible to install the flow tubes in a horizontal plane. FIG. 1 is a front view of the flow tubes. FIG. 2 is a view partly in section of the Coriolis mass flowmeter installed in a vertical plane as viewed from the top (the top of FIG. 1) in order to show the construction of the flow tubes in particular. In FIG. 2, the drive, detecting sensors, etc. are not shown. FIG. 3 is a detail of Part A of FIG. 1.

The flow tubes 1 and 2 of the Coriolis mass flowmeter are bent tubes curved in a portal shape and both the tubes have the same shape. These flow tubes are fabricated from one continuous conduit. As mentioned above, flow tubes are portions of tube driven for resonance to produce Coriolis forces and they are expressed by flow tube 1 and flow tube 2. The whole of the flow tubes, including connecting portions which connect these two flow tubes together, and an inlet portion and an outlet portion connected to outer piping, is fabricated from one conduit. This Coriolis mass flowmeter is horizontally symmetric and permits a liquid to flow in and out from either side. However, the following description is based on the assumption that in the Coriolis mass flowmeter shown, a fluid to be measured flows in from the left side of FIG. 1 (FIG. 2) and flows out to the right side of the figure.

A liquid to be measured flows horizontally into an inlet portion of conduit after passing through an external connecting portion 35 from external inlet piping. The inlet portion of conduit is bent upward in the shape of the letter L as shown in FIG. 1 and is also bent in a different direction as shown in FIG. 2. The liquid to be measured passes through a flow tube 2 from this inlet portion of conduit, enters a flow tube 1 after passing through the connecting portion of conduit from the bottom on the right side of FIG. 1, and further passes through the outlet portion of conduit from the flow tube 1, finally flowing out into external outlet piping from an external connecting portion 36. The outlet portion of conduit is bent and fabricated symmetrically with respect to the inlet portion of conduit.

The conduit is thus formed in a loop shape and bent in an L shape to the external connecting portions 35 and 36 to inlet piping/outlet piping in the directions opposite to each other. At the same time, bending in a different direction is performed and the external connecting portions to inlet piping and outlet piping are arranged on the same axis, thus facilitating external horizontal connection during assembling.

The flow tubes 1 and 2 are provided with a drive 15 and a pair of detecting sensors 16 and 17, which will be described later in detail, and the drive and detecting sensors are wired. Near both ends of the flow tubes 1 and 2 are provided bases plates 26 and 27 for forming the nodes of vibrations when the flow tubes 1 and 2 are driven like a tuning fork. These bases plates 26 and 27 are secured to each of the flow tubes 1 and 2 so that the flow tubes 1 and 2 are kept parallel.

A supporting member 33 for fixing each end of the flow tubes 1 and 2 is fabricated from a sheet as seen in FIG. 3, which shows a detail of Part A of FIG. 1. The inlet portion and outlet portion are fixed by means of different supporting members 33 for each flow tube. The installation and fixing of the flow tubes are made easy by using different supporting members 33. Furthermore, thermal energy can be reduced to a minimum necessary amount in vacuum-brazing the flow tubes to the supporting members 33 by using members of small thermal capacity.

This supporting member 33 is connected to the fixing member 32 of hollow construction in at least two upper and lower places. The illustrated fixing member 32, which is formed as a hollow member having an almost rectangular shape in cross section, fixes one end of the flow tube with both of the upper and lower sides of the rectangle, respectively. As a consequence, each end of one flow tube is supported in two places on the two sides of the hollow rectangle, and other two sides forming the sides of the fixing member 32 of hollow rectangle are fixed to an outer casing 30 as will be described later. In general, a bar or pipe that vibrates like a cantilever must be secured with a certain width. For example, if fixed by a block-like supporting member, a vibrating tube receives various stresses from the supporting member due to a difference in thermal capacity. An ideal type of supporting is supporting at two pints. This gives only accurate positions of support and does not produce an unnecessary effect. Therefore, the connection in at least two upper and lower places can prevent inconvenient torques, vibrations and shakes of the conduit.

The same material as that for the thin-walled flow tubes can be used for the supporting members 33, thereby enabling the penetration of impurities into the thin-walled flow tubes during securing by brazing to be prevented and various problems arising from the expansion and shrinkage due to a difference in thermal capacity to be avoided. Materials usually adopted in this technical field, such as stainless steel, Hastelloy and titanium alloys, can be used as the material for the flow tubes 1 and 2.

A material having a predetermined strength can be used as the material for the fixing member 32. Furthermore, unlike the supporting member 33 that is generally expensive because of the use of the same material as that for the flow tubes, cost for the fixing member 32 can be saved by using an inexpensive material that does not require corrosion resistance, for example. In other words, though the fixing by the fixing member 32 must be firm, the use of a hollow structural member can achieve firm two-point supporting, provides a small thermal capacity, and allows the performance as a flowmeter to be improved due to the avoidance of the problem during brazing, a reduction of cost and an improvement in temperature responsiveness. The securing of the supporting member 33 to the fixing member 32 can be performed, as shown in FIG. 3, by preparing a corresponding cut away portion in the fixing member 32 with a size a little smaller than the supporting member 33, superposing the supporting member 33 on this cut away portion, and securing the surrounding area using an appropriate securing means such as brazing and welding.

The illustrated Coriolis mass flowmeter is provided with an outer casing 30 having a hollow shell construction (a curved construction formed by a sheet which is thin compared with the size of the structure). This outer casing has an inlet portion and an outlet portion, which are provided with a hollow cylindrical member 40 and a hollow cylindrical member 41, respectively. In assembling the outer casing 30, the hollow cylindrical members 40 and 41 are inserted from outside after passing external connecting portions 35 and 36 of the conduit portion through the inlet and outlet portions of the outer casing, respectively, and gaps between the outer connecting portions 35 and 36 and the hollow cylindrical members 40 and 41, and gaps between the hollow cylindrical members 40 and 41 and the outer casing 30 are secured by welding and the like. This permits mechanical fixing and, at the same time, can shut off the interior space from outside in conjunction with a pressure-resistant case 31. Because the outer casing 30 has a hollow shell construction for accommodating the conduit portion, the installation of the conduit portion can be easily and positively carried out, making it easy to form an integrated construction. Furthermore, this can strongly protect the vibrating structural portions of flow tubes against the stresses from outer piping. The term "conduit portion" used in the present specification refers to one conduit portion including the flow tubes and accessory components of the conduit that include the drive 15, the pair of detecting sensors 16 and 17 and the fixing member 32.

In integrating the construction of the conduit portion as a unit, incorporating the unit into the outer casing 30 of shell construction and connecting it, the feature of the present invention that the shape of the outlet portion/inlet portion of conduit is the shape of the letter L makes it possible to incorporate and install the unit within the outer casing 30 with a length a little smaller than that of the unit after the assembling of the unit. Thus, the construction of the conduit portion as a unit makes assembling easy and can reduce the assembling time.

In order to ensure that the external vibrations of piping, etc. can be reduced, the connection of the fixing member 32 to the outer casing 30 is performed not over the whole surface of the side of fixing member 32, that is, it is performed in spots rather than on the surface. This connection is effected by securing four independent supporting portions 38 as shown in FIG. 2 to both of the fixing member 32 and outer casing 30, for example, by welding. This can reduce external vibrations (of piping system, self-oscillation system, etc.). After this assembling, the pressure-resistant case 31 is tightly connected integrally to the outer casing 30 by an appropriate means such as welding and screwing to form a pressure resistant vessel. This prevents the fluid flowing through the tubes from flowing out of the pressure-resistant vessel even if the tubes should be broken.

The drive 15 that drives the flow tubes 1 and 2 of such two parallel bent tubes is usually composed of a coil and a magnet. The coil of the drive is mounted on one of the two flow tubes 1 and 2, and the magnet is mounted on the other flow tube. The coil and the magnet drive the two flow tubes 1 and 2 with resonance in reverse phases relative to each other. The pair of vibration detecting sensors 16 and 17, each composed of a coil and a magnet, is installed in the positions horizontally symmetrical with respect to the installed position of the drive 15 to detect a difference in phase which is proportional to Coriolis forces. The coil and magnet of this sensor are also independently installed via fixtures; that is, the coil is mounted on one flow tube and the magnet is mounted on the other flow tube.

As shown in FIG. 1, the wiring to the coil of the drive 15 is passed through a wiring lead-in portion 39 attached to the outer casing 30 from outside this Coriolis mass flowmeter, guided along a column 10 and connected from the end of the column via a flexible printed board 12. This lead-in portion 39 shuts off the internal space and external space although it allows the wiring to pass through. The flexible printed board itself is known and a flexible printed board of prescribed width in which copper foil for wiring is sandwiched with polyimide films can be used.

The wiring of the pair of sensors 16 and 17 is passed from outside to the end of the column 10 in the same manner as with the wiring to the drive 15. From the end of the column 10, the wiring is then guided via another flexible printed board disposed opposite to the above flexible printed board 12 and then via Teflon wires (copper wires or copper foil sheathed with Teflon) which are guided on the surface of a Teflon tube in the two right and left directions.

The column 10 is thus mounted to the fixing member 32 in a manner that the front face of the column 10 is opposed to the drive 15 to effect the wiring to the coils of the drive and the detecting sensors. Furthermore, the column 10 can also support the wiring to a temperature detecting sensor 20.

When a fluid to be measured flows through a Coriolis mass flowmeter thus fabricated, a flow rate measurement is made in a usual manner. The drive 15 installed in the middle portion of the flow tubes 1 and 2 drives with resonance one flow tube in a reverse phase relative to the other flow tube in a direction vertical to the plane where the flow tubes 1 and 2 are present. A difference in phase due to Coriolis forces based on the resonance is detected by the pair of vibration detecting sensors 16 and 17 installed between the fixed ends and middle of the flow tubes 1 and 2.

The present invention is not limited to flow tubes of the above portal type and can be applied to loop-type Coriolis mass flowmeters using bent tubes with any shape such as a circle and the letter U, for example.

Industrial Applicability

As mentioned above, the present invention can provide a Coriolis mass flowmeter which has a simple construction of connection to external piping and can be assembled in a simplified manner and in which the flow tubes themselves need not to be three-dimensionally bent while maintaining the advantage of the Coriolis mass flowmeter containing a parallel double bent tube formed by bending one tube that pressure losses or clogging with a fluid do not occur because there is no branching portion or junction portion.

What is claimed is:

1. A Coriolis mass flowmeter comprising:

a conduit structure fabricated from one bent conduit with an inlet portion, an outlet portion, a first flow tube, a second flow tube parallel to said first flow tube, said first flow tube and said second flow tube for applying vibrations and detecting Coriolis forces based on the applied vibrations, and a connecting portion connected to said first flow tube and to said second flow tube;

a first bases plate connected to each of said first flow tube and second flow tube adjacent to a respective end of each of said first flow tube and second flow tube;

a second bases plate connected to each of said first flow tube and second flow tube adjacent to another respective end of each of the first flow tube and second flow tube, said first bases plate and said second bases plate forming nodes of vibration when the flow tubes are driven;

a fixing member for integrally fixing each respective end of said first flow tube and said second flow tube;

a first supporting member;

a second supporting member;

an outer casing, said fixing member being secured to said outer casing;

an inlet external connecting portion for connection to inlet piping;

an outlet external connecting portion for connection to outlet piping, said inlet portion of said conduit extending between said inlet external connecting portion and an inlet of one of said flow tubes and being bent in an L shape and being further bent in another direction, said outlet portion of said conduit extending between said outlet external connecting portion and an outlet of another of said flow tubes being bent in an L shape symmetrically with respect to said inlet portion and being further bent in another direction, said inlet external connecting portion and said outlet external connecting portion being arranged coaxially, said first supporting member including sheets individually fixing ends of said first flow tube, said second supporting member including sheets individually fixing ends of said second flow tube, said first and second supporting members being each fixed by said fixing member, said fixing member having a hollow structure and said supporting members being fixed to said fixing member at two opposite locations of said hollow structure for each end of each of the flow tubes and fixes the ends of the flow tubes.

2. A Coriolis mass flowmeter according to claim 1, wherein said outer casing has a hollow shell construction and is provided with an inlet portion of outer casing and an outlet portion of outer casing through which said first external connecting portion and said outlet external connecting portion , respectively, are passed through and secured.

3. A Coriolis mass flowmeter according to claim 2, wherein said fixing member is supported by said outer casing in a plurality of places independently, and not over the whole surface of said outer casing.

4. A Coriolis mass flowmeter according to claim 1 further comprising a pressure-resistant case to be tightly connected to the outer casing, said pressure-resistant case accommodating one conduit including said flow tubes and accessory components of the conduit, said accessory components including a drive, a pair of detecting sensors and said fixing member.

5. A Coriolis mass flowmeter comprising:

an integral conduit structure with an inlet portion, an outlet portion, a first flow tube portion extending substantially in a first flow tube portion plane, a second flow tube portion extending substantially in a second flow tube portion plane, said first flow tube portion plane, being substantially parallel to said second flow tube portion plane and a connecting portion connecting said first flow tube portion to said second flow tube portion;

a first external connecting portion for connection to inlet piping;

a second external connecting portion for connection to outlet piping, said inlet portion of said conduit extending between said first external connecting portion and an inlet of said first flow tube portion and being bent in an L shape and being further bent in another direction, said outlet portion of said conduit extending between said second external connecting portion and an outlet of said second flow tube portion and being bent in an L shape symmetrically with respect to said inlet portion and being further bent in another direction, said first external connecting portion and said second external connecting portion being arranged coaxially;

a fixing member;

an outer casing, said fixing member being secured to said outer casing;

first supporting members connected to said fixing members and including sheets individually fixing ends of said first flow tube portion;

second supporting members connected to said fixing members and including sheets individually fixing ends of said second flow tube portion, said first flow tube portion and said second flow tube portion extending from one side of said fixing element, said connecting portion being connected to said first flow tube portion and said second flow tube portion and extending at another side of said fixing element, said inlet portion being connected to said first flow tube portion and extending at said another side of said fixing element and said outlet portion being connected to said second flow tube portion and extending at said another side of said fixing element;

a first bases plate connected to each of said first flow tube and second flow tube adjacent to a respective end of each of said first flow tube and second flow tube;

a second bases plate connected to each of said first flow tube and second flow tube adjacent to another respective end of each of the first flow tube and second flow tube;

a drive connected to said first flow tube portion and connected to said second flow tube portion for driving said first flow tube portion and said second flow tube portion relative to nodes of vibration formed by said first bases plate and said second bases plate; and a pair of detecting sensors for detecting vibrations of said first flow tube portion and said second flow tube portion.

6. A Coriolis mass flowmeter according to claim 5, wherein said fixing member has a hollow structure and said supporting members are fixed to said fixing member at opposite locations of said hollow structure for each end of each of said flow tubes to fix ends of said flow tubes.

7. A Coriolis mass flowmeter according to claim 5, wherein said outer casing has a hollow shell construction and is provided with an inlet portion of outer casing and an outlet portion of outer casing through which said first external connecting portion and said first external connecting portion, respectively, are passed through and secured.

8. A Coriolis mass flowmeter according to claim 7, wherein said fixing member is supported by said outer casing in a plurality of places independently, and not over the whole surface.

9. A Coriolis mass flowmeter according to claim 5 further comprising a pressure-resistant case to be tightly connected to the outer casing, said pressure-resistant case accommodating one conduit including said flow tubes and accessory components of said conduit, said accessory components including said drive, said pair of detecting sensors and said fixing member.

10. A method of making a Coriolis mass flowmeter with a conduit having an inlet portion, an outlet portion, two parallel flow tubes for applying vibrations and detecting Coriolis forces based on the applied vibrations, and a connecting portion for connecting the two flow tubes, the method comprising the steps of:

fabricating the conduit as a single bent conduit through which a fluid to be measured flows in series through the two flow tubes;

integrally fixing each end of said two flow tubes by means of a fixing member;

providing a first external connecting portion to be connected to inlet piping and a outlet external connecting portion to be connected to outlet piping;

bending the inlet portion of conduit between the external connecting portion connected to inlet piping and the inlet of one flow tube in an L shape and further bending the inlet portion in another direction;

bending the outlet portion of conduit between the external connecting portion connected to outlet piping and the outlet of the other flow tube in an L shape symmetrically with respect to the inlet portion of conduit and further bending the outlet portion in another direction;

providing a unit of accessory components including a fixing member for fixing each end of the flow tubes, a drive and a pair of detecting sensors;

arranging the unit of accessory components in an outer casing having a shell construction such that said first external connecting portion and said outlet external connecting portion are on the same axis;

providing a first supporting member including sheets individually fixing ends of one of the flow tubes to the fixing member;

providing a second supporting member including sheets individually fixing ends of another of the flow tubes to the fixing member, said first and second supporting members being each fixed by the fixing member, the fixing member having a hollow structure and the supporting members being fixed to the fixing member at two opposite locations of the hollow structure for each end of each of the flow tubes and fixes the ends of the flow tubes;

providing a first bases plate connected to each of said first flow tube and second flow tube adjacent to a respective end of each of said first flow tube and second flow tube; and providing a second bases plate connected to each of said first flow tube and second flow tube adjacent to another respective end of each of the first flow tube and second flow tube such that said first bases plate and said second bases plate form nodes of vibration when the flow tubes are driven.

* * * * *